United States Patent [19]

Tsai et al.

[11] Patent Number: 4,811,180
[45] Date of Patent: Mar. 7, 1989

[54] CAR LIGHT STRUCTURE WITH DUAL PURPOSE OF AUXILIARY ILLUMINATING LIGHT AND FOGLIGHT

[76] Inventors: Wen Tsung Tsai; Ed Wang, both of No. 4 Cheng Kung Road, Tu-Cheng County, Taipei, Taiwan

[21] Appl. No.: 141,059

[22] Filed: Jan. 5, 1988

[51] Int. Cl.$^4$ .............................................. F21V 9/00
[52] U.S. Cl. ..................................... 362/284; 362/80; 362/324; 362/276
[58] Field of Search ................... 362/61, 63, 65, 80, 362/276, 319, 322, 324, 277, 282, 284, 293

[56] References Cited

U.S. PATENT DOCUMENTS

| | | | |
|---|---|---|---|
| 1,185,850 | 6/1916 | Smith | 362/284 X |
| 1,628,036 | 5/1927 | Doherty | 362/324 |
| 2,673,926 | 3/1954 | Siringo | 362/322 |
| 4,663,696 | 5/1987 | Miyazawa et al. | 362/284 X |
| 4,685,037 | 8/1987 | Akiyama et al. | 362/373 X |

*Primary Examiner*—Ira S. Lazarus
*Assistant Examiner*—Peggy Neils
*Attorney, Agent, or Firm*—Holman & Stern

[57] ABSTRACT

A car light structure has the dual purpose of an auxiliary illuminating light and foglight. The light has a protective cover capable of automatically opening and closing, wherein the structure can light when opening the protective cover actuated by the revolution and counterrevolution of a motor, and can extinguish or light when closing the protective cover so as to achieve the dual purpose of an auxiliary illuminating light and foglight.

5 Claims, 3 Drawing Sheets

CAR LIGHT STRUCTURE WITH DUAL PURPOSE OF AUXILIARY ILLUMINATING LIGHT AND FOGLIGHT

The foglight installed on the car in general acts only when it is foggy but has no action when it is not foggy. We know that the foggy weather only occurs once in a while, so the foglight is left idle most of the time. In case of substituting the foglight for the malfunctioned headlight or supplementing the headlight when it is quite dark, or darker, even when it is too early to turn on the headlight and will be very inconvenient if not to turn on it, it is by no means economical. Among the conventional car lights, there is a structural design wherein opening a light shade is used to turn on the light and turning off the light is accomplished by closing the shade. However, there is no capable device of changing the purpose of car light through opening and closing a protective cover. In other words, when opening the cover the device can be used as an auxiliary illuminating light, and when closing the same, it can be used as a foglight.

Therefore, the main purpose of the present invention is to offer a structural design of car light body with an automatic protective cover which is capable of changing it to a foglight or an auxiliary illuminating light in the course of opening or closing the said cover. Summary of the invention:

A car light structure is provided with dual purpose of auxiliary illuminating light and foglight wherein the car light is designed with a yellow automatic protective cover which can be actuated to open and close by the revolution and counter revolution of a motor. When the protective cover is opened, the auxiliary illuminating light therein is turned on, when the said cover is closed, the said light is turned off; and when the cover is entirely closed, the motor may stop revolving and the light may be changed as a foglight.

DETAILED DESCRIPTION OF THE PREFERRED EMBODIMENT

Figure 1:
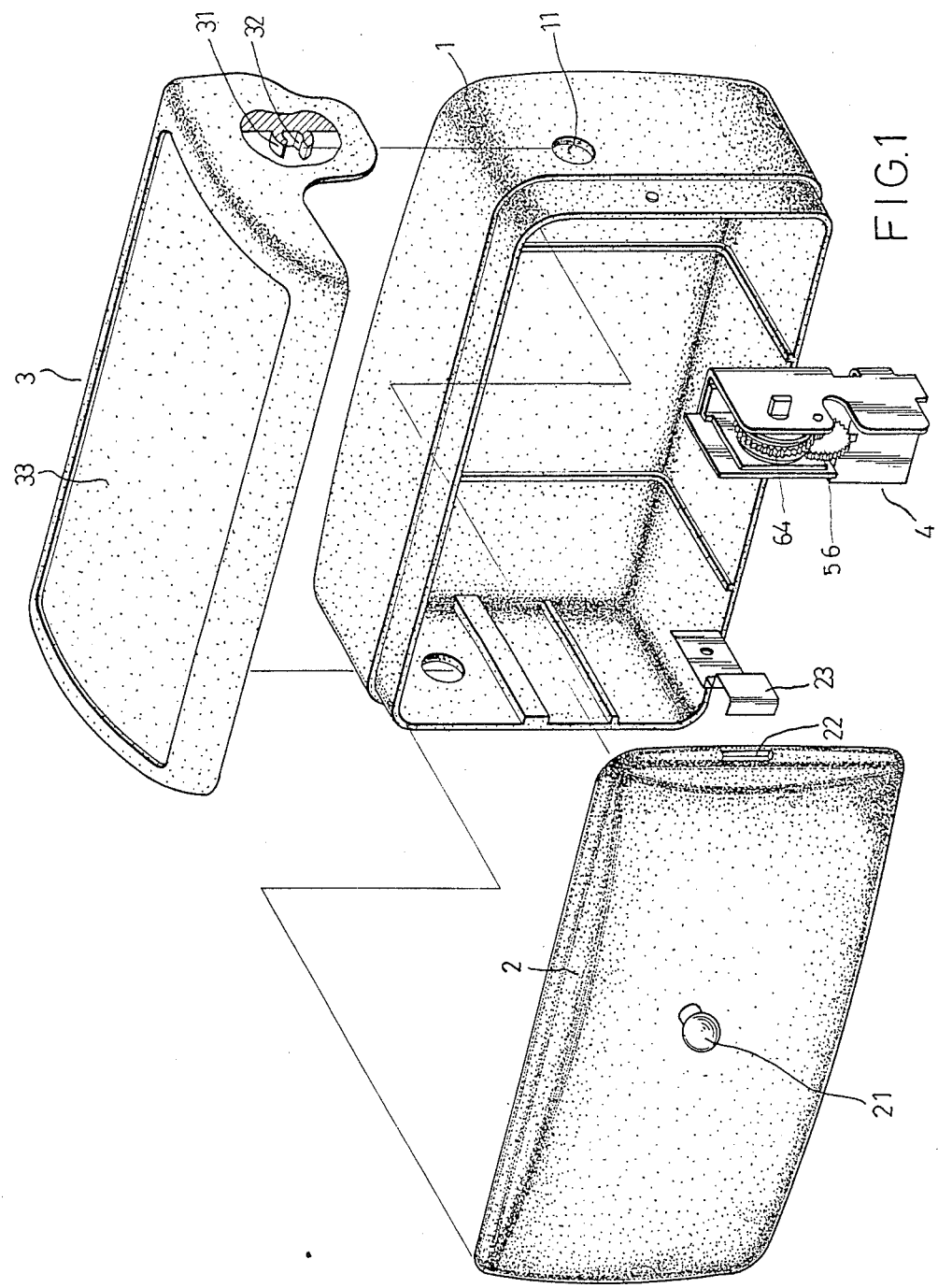
FIG. 1 is an exploded elevational view of the present invention.
Figure 2:
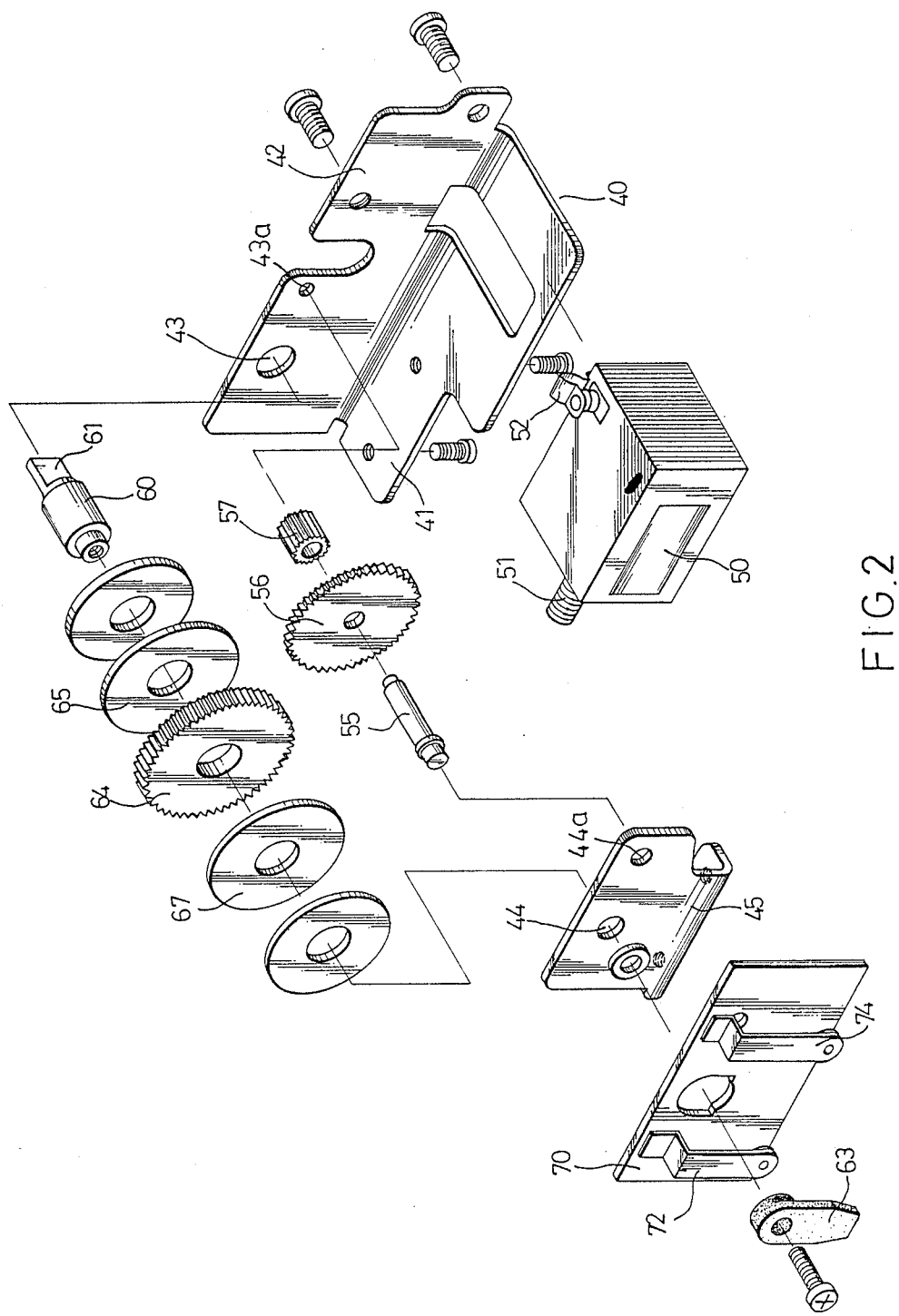
FIG. 2 is an exploded view of transmission structure in the light shade of the present invention.

As shown in FIG. 1 and 2, the structure of the present invention consists of a rear casing(1), a reflection mirror (2), a protective cover (3) and a transmission module or mechanism (4), wherein the rear casing (1) is an open hollow body to which two opposite end sides are provided with a pivot joint hole(11) respectively, a bulb(21) is fixed in the reflection mirror(2) of which two sides are provided with a hole(22) respectively for a folded end side of snap ring(23) to engage in and another side of the mirror may have a hole which may be locked onto the end side of said rear casing(1) by a screw. A convex elastic snap member(31) is provided in the inner surface of twoend sides of said protective cover(3) respectively and may be caught into the pivot joint hole(11) on the two end sides of said rear casing(1) for assembly. Since a clampng hole(32) is provided to the said elastisc snap member(31), a main shaft(61) of the transmission mechanism(4) may be inserted into the clamping hole(32) so as to actuate the protective cover(31) to move pivotally to open and close up and down through the elastic snap member(31) caught in the pivot joint hole(11) on the two end sides of rear casing(1). The protective cover(3) is dustproof and strong enough to resist the damage of reflection mirror(2) by a slight collision and provided with a mirror sheet(33) in yellow or other eye-catching colors so that when the protective cover(3) is entirely closed, the light emitted out therefrom will be changed into a foglight through the colored mirror sheet(33).

The transmission mechanism(4) is secured on the right side of the rear casing(1) and composed of a main seat or plate(40), a secondary seat or plate(45), wherein the main seat(40) has a bottom side(41) and a vertical side(42) which are respectively provided with a plurality of small holes and a larger shaft hole(43) for assembly with the secorary seat(45) and for receipt of further components of the transmission mechanism to be described. The secondary seat(45) also has a bottom side and a vertical side which are provided with a plurality of small holes and a larger main shaft hole(44) and it may be fixed onto the main seat(40) so as to help install some members onto the main seat(40). The transmission mechanism is further composed of a transmission motor(50), a rotating shaft(55), a main shaft(60), a wiring plate(70) and a plurality of gears 56, 57, 64, wherein the transmission motor(50) is secured onto the main seat(40), and a safety member(52) is provided at the power source contact on the tail end surface thereof and composed of double metallic sheets with different expansion coefficient. When these metallic sheets are subject to heat, they will expand and automatically separate from the power source contact on the motor(50) to stop rotating the motor(50), so the motor(50) can automatically stop rotating when under undue heat.

One end of the rotating shaft(55) is pivotally jointed in the shaft hole(43a) on the main seat(40) and another end thereof is pivotally jointed in the shaft hole(44a) on the secondary seat(45), and a large gear(56) and a small gear(57) are provided to rotate with the said shaft(55), wherein the large gear(56) is engaged with a drive-worm(51) on the motor(50), and the small gear(57) is engaged with another large gear(64) so that when motor 50 is operated shaft 55 and also gear 64 will be rotated through worm 51. Gear 64 is secured to shaft 60, so that this shaft is also rotated by motor 50. One end of said main shaft(60) may be pivotally jointed onto the vertical side(42) of main seat(40) and inserted into the clamping hole(32) of protective cover(3), so that the main shaft(60) can be assembled with the protective cover(3); another end of main shaft(60) may be pivotally jointed into the shaft hole(44) of secondary seat (45) so that a rotary switch gate member or contact(63) can be locked thereonto. Meantime, a large gear(64) is installed on the main shaft(60) so as to be enable to engage with the small gear(57) on the rotating shaft(55), one clamping member each(65)(67) is installed in the front and rear of large gear(64) so as to keep the suitable frictional tightness between each clamping members(65)(67) and the large gear(64). Therefore, the large gear(64) under the unexpected resistasnce from the light shade and main shaft(60) in the course of rotation (such as the snow accumulated on the light shade to resist opening the light shade) may cause the race rotation, and the gears will not create any noise.

Figure 3:
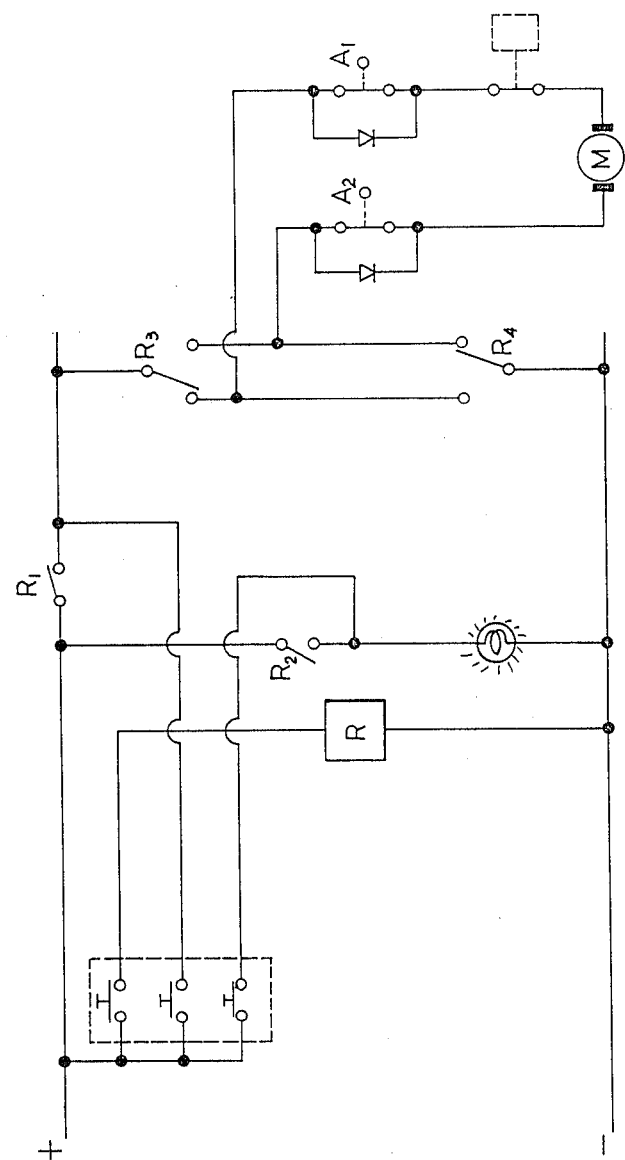
FIG. 3 is a circuit diagram of the present invention.

A wiring plate(70) is fixed to the outer side of secondary seat(45) and provided with a shaft hole for inserting the main shaft(60), the two sides of said shaft hole are provided with two fixed switch conducting members or contacts(72)(74) to control the rotation of the motor(50), and two points may be set for these two switch conducting members(72)(74) for cutting off the motor (50). The circuit concerned is shown in FIG. 3. When putting the present invention into practice, a 6-legs switch control of 3-stages type SW may be provided. When the switch-push rod on the 6-legs switch SW is pushed to the upper position of "ON" at the first stage, the current flows through the relay R to close the contacts R 1, R 2, R 3, R 4 to turn on the bulb(21), while current from the positive terminal flows through contanct R1 (in its closed position), through contact R3 (at its right terminal), initially through the diode D2 coupled across initially open contact A2, through Motor M, through closed contact A1, and through switch R4 (at its left terminal) to the negative terminal, whereby the motor (50) rotates clockwise to actuate both large and small gears(56)(57) through the worm(51) so that the small gear(57) can actuate the large gear(64) to rotate the main shaft(60) which actuates the protective cover(3) to open. Meantime, the switch member(63) is actuatd to move toward right. When the protective cover(3) is entirely open, the switch gate member(63) has reached at a position below the switch conducting member (74) to contact therewith and forms an open circuit (i.e. to cut off the switch contact at A1) to cut off the motor(50) and stop rotating and the bulb(21) can be used as an auxiliary illuminating light. When the switch-push rod is pushed to the middle position of "OFF" at the second stage, no current flows through the bulb (21), so the bulb(21) will not light, but current flows from the positive terminal, through the middle position of switch SW, contact R3 (at its left terminal), initially through the diode D1 across initially open contact A1, through Motor M, through closed contact A2, and through contact R4 (at its right terminal) to the negative terminal, whereby the motor(50) rotates counter-clockwise to actuate the protective cover(3) to close until the switch gate member (63) contacts and actuates the switch conducting member(72) (i.e. to cut off the switch contact at A2) to cut off the motor(50) so that the protective cover(3) is closed and the bulb(21) is also extinguished. When the switch-push rod is pushed to the lower position, the current flows only to the bulb(21) but not to the motor(50), so the motor(50) remains inactive but the bulb(21) lights and can be used as a foglight through the light shining on the protective cover (3) with a filter sheet (33) in yellow or other colors. Therefore, same one light may be used as an auxiliary illuminating light and a foglight.

What is claimed is:

1. A light structure for a vehicle comprising a dished casing having a light-transmitting base wall and a peripheral wall upstanding from the base wall, the peripheral wall including opposite side walls, a bottom wall and a top wall, a reflector with a light bulb, attachment means on the peripheral wall and on the reflector for releasably attaching the reflector to the casing for transmitting light from the bulb through the base wall of the casing, a light-transmitting cover for selective positioning over the exterior of the base wall to modify the character of light transmitted therethrough, the side walls of the casing having respective pivot apertures therein and the cover having side portions with internal snap members and the cover having siide portions with internal snap members received in said apertures and pivotally mounting the cover on the casing for pivotal movement between selective positions respectively covering and uncovering the base wall of the casing, a transmission module received in the casing for driving the cover between said positions, the transmission module including opposite side plates, an electric motor between the side plates, a main shaft journaled between the side plates and transmission gear means connected between the motor and the main shaft for rotating the main shaft in response to rotation of the motor, the main shaft having a drive portion projecting from one of said side plates into a drive aperture formed in one of said snap members for rotating the cover in response to rotation of the main shaft, the main shaft further having a rotary switch contact thereon projecting from an opposite one of the side plates, said opposite one of the side plates having means mounting a pair of fixed switch contacts respectively engageable by the rotary switch contact, the fixed switch contacts and the motor being adapted for connection in an electric circuit for controlling operation of the light and movement of the cover between said positions.

2. A light structure according to claim 1 wherein the gear means includes a driven gear on the main shaft and friction disks between the respective side plates and the driven gear for providing resistance to rotation of the driven gear.

3. A light structure according to claim 2 wherein the motor has a worm-drive output, and wherein the module includes an intermediate shaft between the side plates, the intermediate shaft carrying a worm wheel meshing with said output and a transmission gear meshing with said driven gear.

4. A light structure according to claim 1 wherein the snap members are of a part ring-shaped form.

5. A light structure according to claim 1 wherein the circuit includes means for operating the cover to uncover the base wall and for lighting said bulb when the cover uncovers the base wll, for operating the cover to cover the base wall and for extinguishing the bulb when the cover begins covering the base wall, for stopping the motor when the cover is in said positions and for operating the bulb independently of the cover.

* * * * *